United States Patent
Elliott et al.

(10) Patent No.: US 7,752,385 B2
(45) Date of Patent: *Jul. 6, 2010

(54) FLEXIBLE DISK STORAGE ENCLOSURE

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 11/470,885

(22) Filed: Sep. 7, 2006

(65) Prior Publication Data

US 2008/0062630 A1 Mar. 13, 2008

(51) Int. Cl.
*G06F 13/12* (2006.01)
(52) U.S. Cl. ...................................... 711/112
(58) Field of Classification Search .................. None
See application file for complete search history.

(56) References Cited

U.S. PATENT DOCUMENTS

| | | | |
|---|---|---|---|
| 5,652,893 A * | 7/1997 | Ben-Meir et al. ............ 713/310 |
| 6,044,442 A | 3/2000 | Jesionowski |
| 6,658,526 B2 | 12/2003 | Nguyen et al. |
| 6,779,077 B1 | 8/2004 | Bakke et al. |
| 6,851,031 B2 | 2/2005 | Trimmer et al. |
| 6,874,100 B2 * | 3/2005 | Rauscher ........................ 714/6 |
| 6,889,285 B2 | 5/2005 | Dawson et al. |
| 6,895,300 B2 | 5/2005 | Goodman et al. |
| 6,898,480 B2 | 5/2005 | Goodman et al. |
| 6,983,343 B2 * | 1/2006 | van Cruyningen .......... 710/316 |
| 2005/0018341 A1 | 1/2005 | Brume |
| 2005/0028028 A1* | 2/2005 | Jibbe .............................. 714/6 |

OTHER PUBLICATIONS

Sun StorEdge T3 and T3+ Array Configuration Guide, Sun Microsystem, Aug. 2001.*

* cited by examiner

*Primary Examiner*—Tuan V Thai
*Assistant Examiner*—Duc T Doan
(74) *Attorney, Agent, or Firm*—Dan Shifrin (57) ABSTRACT

A high density storage enclosure houses first and second pluralities of hard disk drives (HDDs). The enclosure may be partitioned into a plurality of virtual enclosures, the first plurality of HDDs being associated with a first virtual enclosure and the second plurality of HDDs being associated with a second virtual enclosure. Configuration of the storage enclosure is performed by an SES processor in the storage enclosure accessing configuration parameters received from an external configuration unit coupled to the storage enclosure. The virtual enclosures may be configured as two (or more) independent virtual enclosures on two (or more) independent fabrics or may be configured in a trunked manner. Power supplies and cooling blowers in the storage enclosure may also be partitioned and assigned to be managed by SES processors in the virtual enclosures.

15 Claims, 11 Drawing Sheets

FLEXIBLE DISK STORAGE ENCLOSURE

RELATED APPLICATION DATA

The present application is related to commonly-assigned and co-pending U.S. application Ser. Nos. 11/470,834, entitled LOGICAL PARTITIONING OF DISK STORAGE ENCLOSURE, 11/470,856, entitled ESTABLISHING COMMUNICATIONS ACROSS VIRTUAL ENCLOSURE BOUNDARIES, and 11/470,907, entitled RECONFIGURABLE FC-AL STORAGE LOOPS IN A DATA STORAGE SYSTEM, filed on the filing date hereof, which applications are incorporated herein by reference in their entireties.

TECHNICAL FIELD

The present invention relates generally to data storage enclosures and, in particular, to configuring a data storage enclosure as multiple virtual storage enclosures.

BACKGROUND ART

Figure 1:
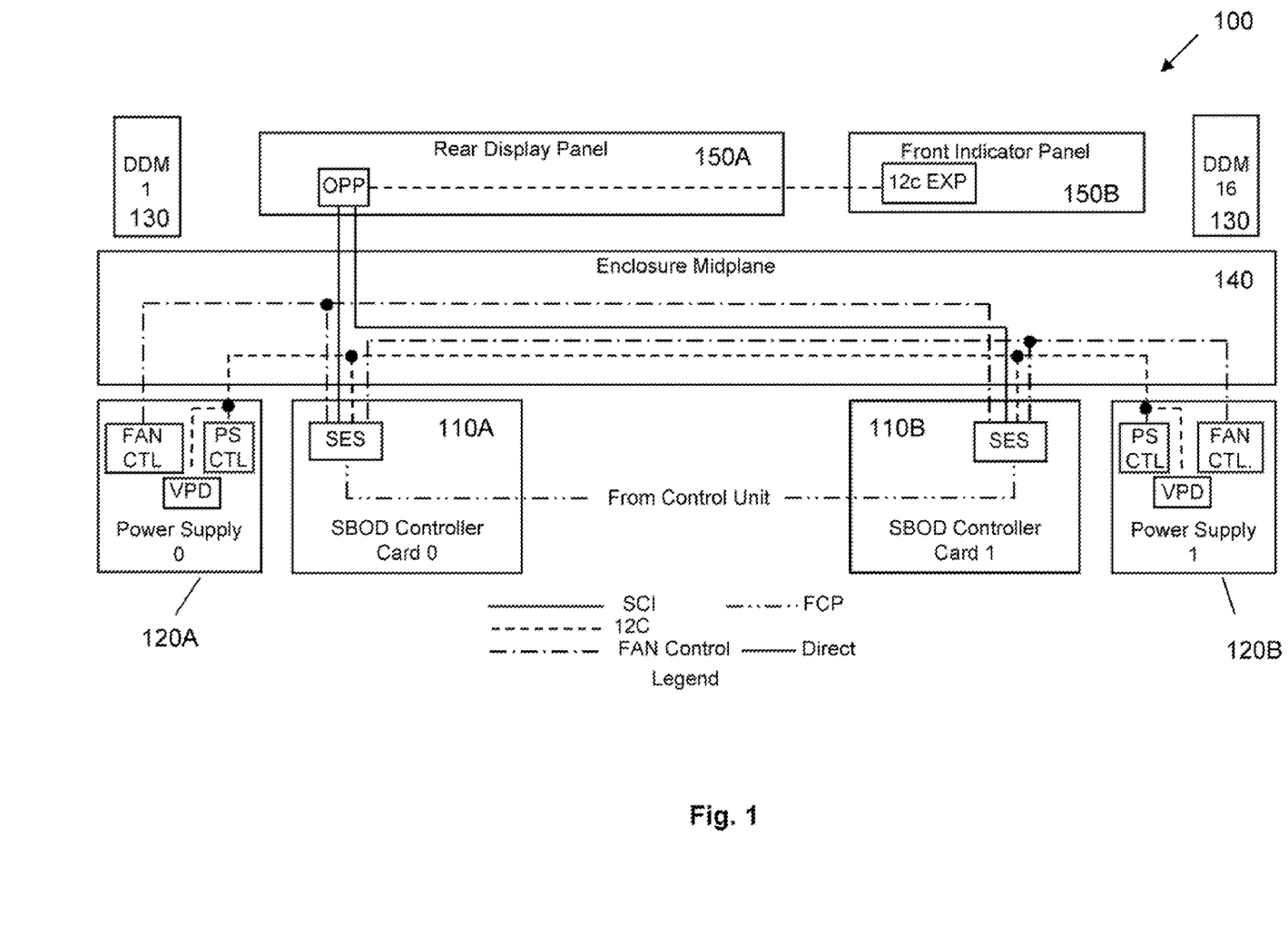
FIG. 1 is a block diagram of a low density storage enclosure.
Figure 2:
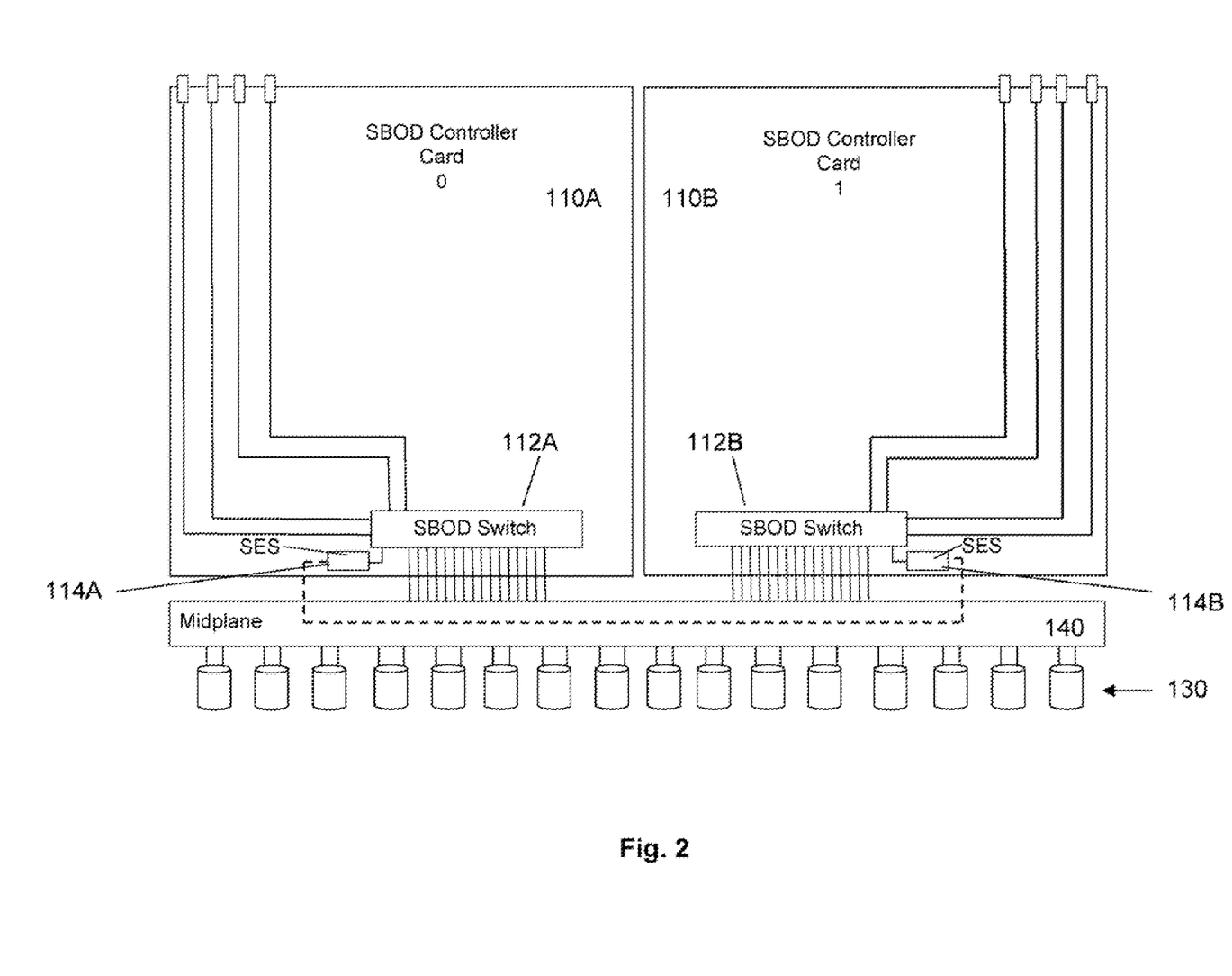
FIG. 2 is a block diagram illustrating interconnections of the controller cards of the storage enclosure of FIG. 1.
Figure 3:
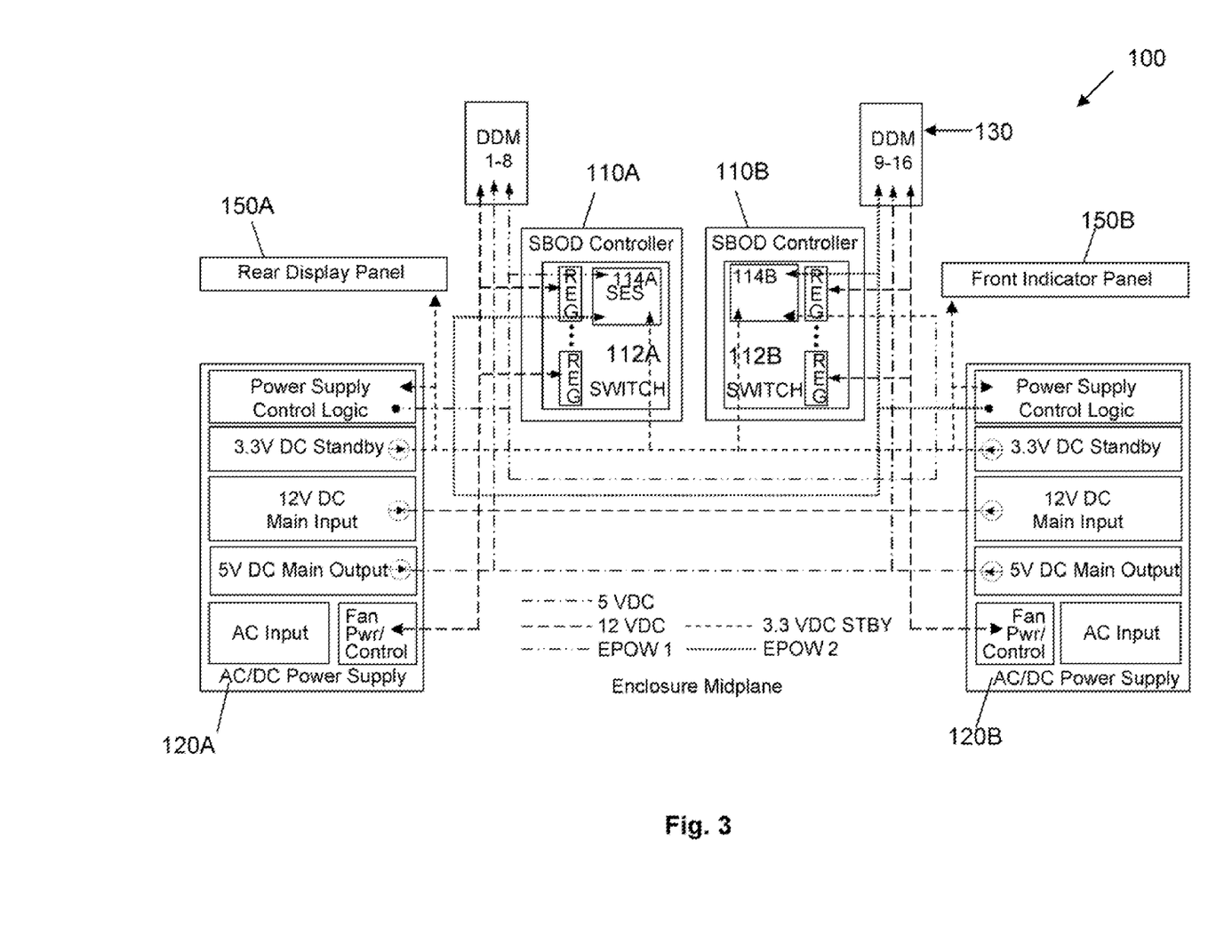
FIG. 3 is a block diagram illustrating the power distribution within the storage enclosure of FIG. 1.

FIG. 1 is a block diagram of a low density storage enclosure 100. The storage enclosure 100 includes a pair of redundant controller cards 110A, 110B, redundant power supplies 120A, 1208 and sixteen disk drive modules (DDMs, also referred to as storage drives, hard disk drives or HDDs) indicated generally as 130. The storage enclosure 100 also includes an enclosure midplane 140 and front and rear panels 150A, 150B. As illustrated in FIG. 2, each controller card 110A, 110B includes a switch 112A, 112B interconnected through the midplane to the storage drives 130, and a SCSI enclosure services (SES) processor 114A, 114B which manages various enclosure-related processes, such as power and cooling. Due to the interconnection through the midplane between the SES processors 114A, 114B in the event that one of the controller cards 110A, 110B fails, the other SES processor may take over. FIG. 3 illustrates the interconnection of the power supplies 120A, 120B with the controller cards 110A, 110B and the DDMs 130 within the enclosure 100.

SUMMARY OF THE INVENTION

When additional DDMs, such as another sixteen, are installed in the enclosure 100, software, firmware and microcode designed for a sixteen-drive enclosure may not be able to accommodate the increased density. To control development effort and resources it is desirable to preserve the existing software, firmware and microcode base with minimal changes, while increasing the storage device density per unit of rack space. A single mechanical enclosure package that can accommodate multiple instances of enclosure designs that preserves the existing software, firmware, and microcode base interfaces is therefore highly desirable.

The present invention provides a high density storage enclosure housing first and second pluralities of hard disk drives (HDDs). The enclosure may be partitioned into a plurality of virtual enclosures, the first plurality of HDDs being associated with a first virtual enclosure and the second plurality of HDDs being associated with a second virtual enclosure. Configuration of the storage enclosure is performed by a SES processor in each of the virtual storage enclosures accessing configuration parameters received from an external configuration unit coupled to the storage enclosure. The virtual enclosures may be configured as two (or more) independent virtual enclosures on independent communication network fabrics or may be configured as virtual enclosures connected in a trunked manner on a single communication network fabric. Power supplies and cooling blowers in the storage enclosure may also be partitioned and assigned to be managed by SES processors in the virtual enclosures. The resulting single, high density, physical enclosure may thus be easily provided in various configurations by including or excluding certain interconnections and by programming SES processors within the storage enclosure. A customer preferring to reduce the cost of the device by eliminating the cost of certain interconnect components (such as four cables and eight small form factor pluggable connections may chose to configure the device in the internally trunked configuration. Alternatively, a customer may prefer implementing multiple independent communication networks for greater reliability or finer granularity in storage allocation to various systems. In this case additional cables and pluggable connection units are used to configure the storage enclosure as two (or more) virtual enclosures on independent communication network fabrics which may be coupled to separate control cards within a single system or multiple systems.

BRIEF DESCRIPTION OF THE DRAWINGS

FIGS. 6A and 68 illustrate a block diagram of the power distribution system of the high-density storage enclosure of FIG. 5B;

DETAILED DESCRIPTION OF THE PREFERRED EMBODIMENT

Figure 4A:
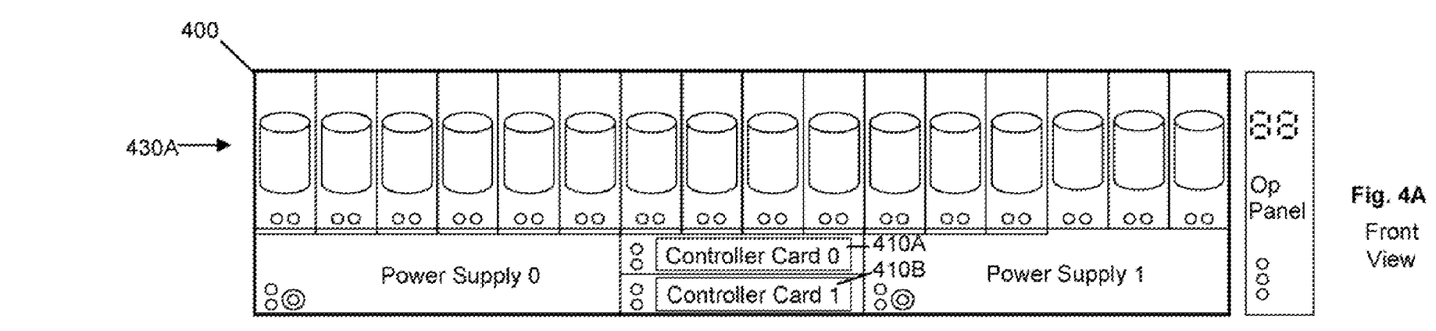
FIGS. 4A, 4B, 4C illustrate front, rear and right side views, respectively, of a high density storage enclosure in which the present invention may be incorporated.
Figure 4B:
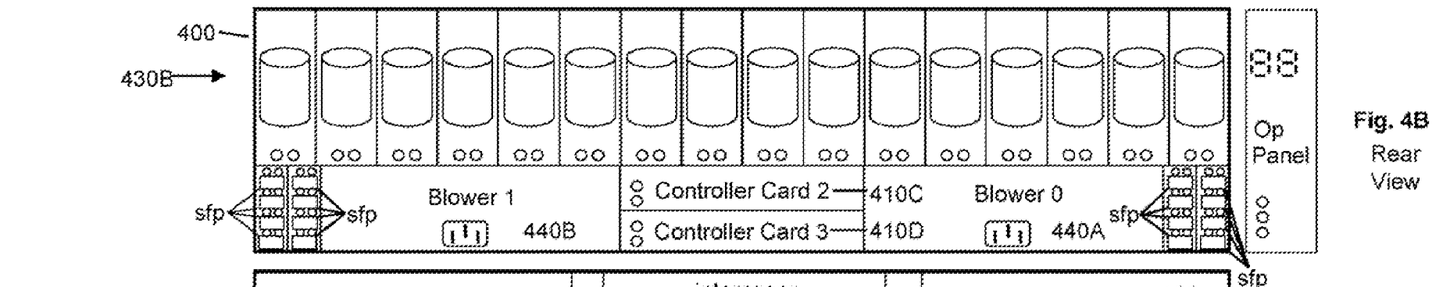
Figure 4C:
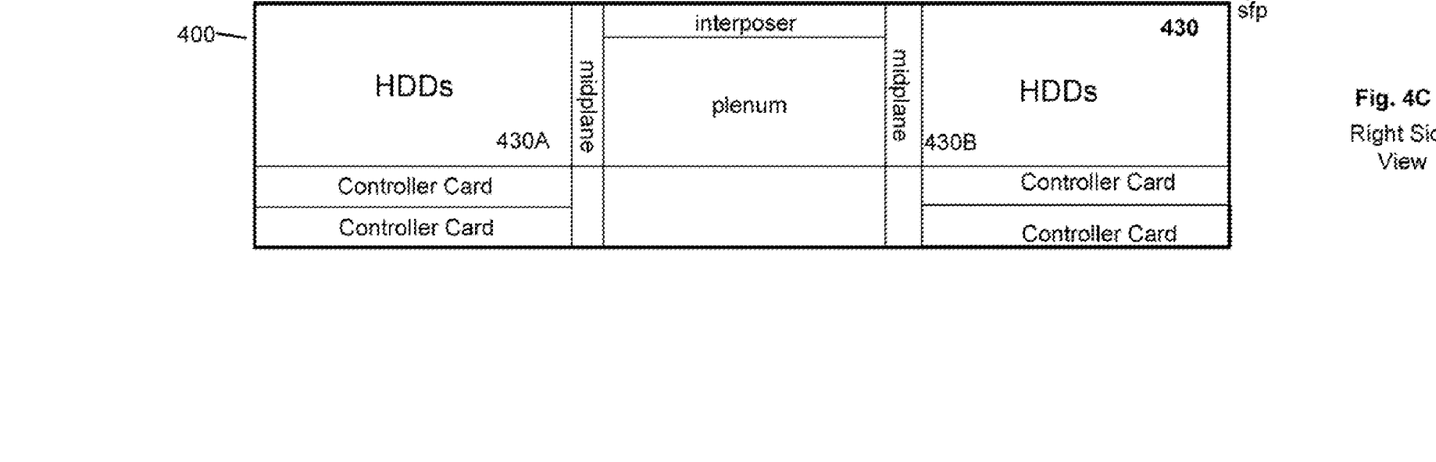

FIGS. 4A, 4B, 4C are representative front, rear and right side views, respectively, of a high density storage enclosure 400 in which thirty-two DDMs 430 have been installed, double the number in the enclosure of FIG. 1. In addition, the enclosure 400 includes two pairs of redundant controller cards 410A and 410B, 410C and 410D as well as a pairs of redundant power supplies 420A, 420B and blowers 440A, 440B. If desired, the enclosure 400 may be configured with a single instance of a storage enclosure (16 DDMs and a single pair of controller cards) by populating a single pair of controller cards in the enclosure and restricting the population of the DDMs to an appropriate placement within the enclosure.

Figure 5A:
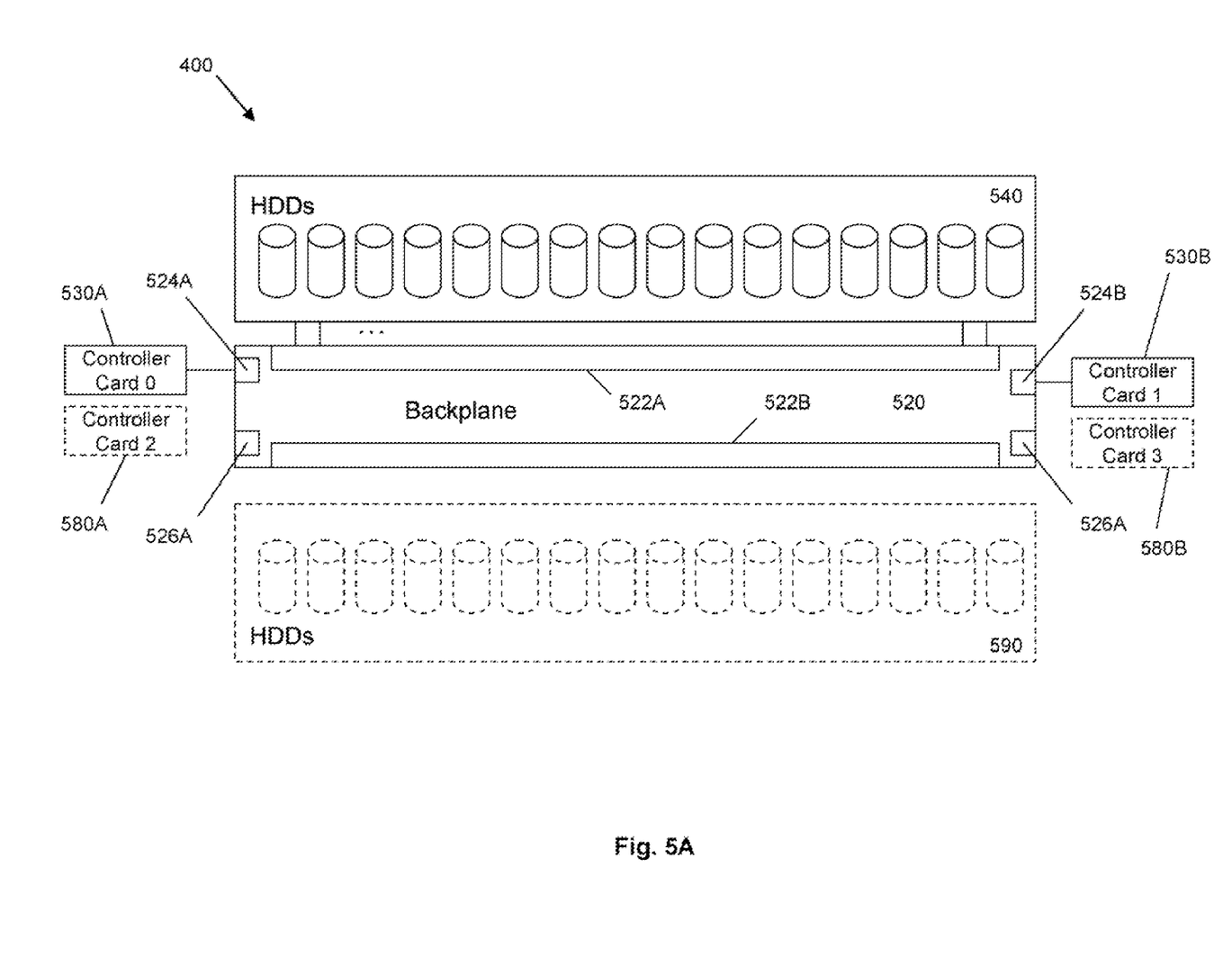
FIG. 5A is a block diagram of a flexible low- or high-density storage enclosure configurable as a single enclosure or as multiple virtual enclosures.

Implementing the present invention and as illustrated in FIG. 5A, a vendor may market a highly flexible storage enclosure, one which is configurable in a number of different ways. In one configuration, the enclosure 400 may be populated in a low density fashion, such as with up to sixteen drives 540 installed in drive connectors 522A on a backplane 520 and two redundant controller cards 530A, 530B installed in controller card connectors 524A, 524B on the backplane 520, in a second configuration, the enclosure 400 may be populated in a high density fashion, such as with up to an additional sixteen drives 590 installed in drive connectors 522B and an additional pair of redundant controller cards 580A, 580B installed in card connectors 526A, 526B, configured as two independent virtual storage enclosures (as will be described with respect to FIG. 5B). In a third configuration, the enclosure 400 may be populated in a high density fashion, such as with thirty-two drives, but configured as trunked virtual enclosures.

Figure 5B:
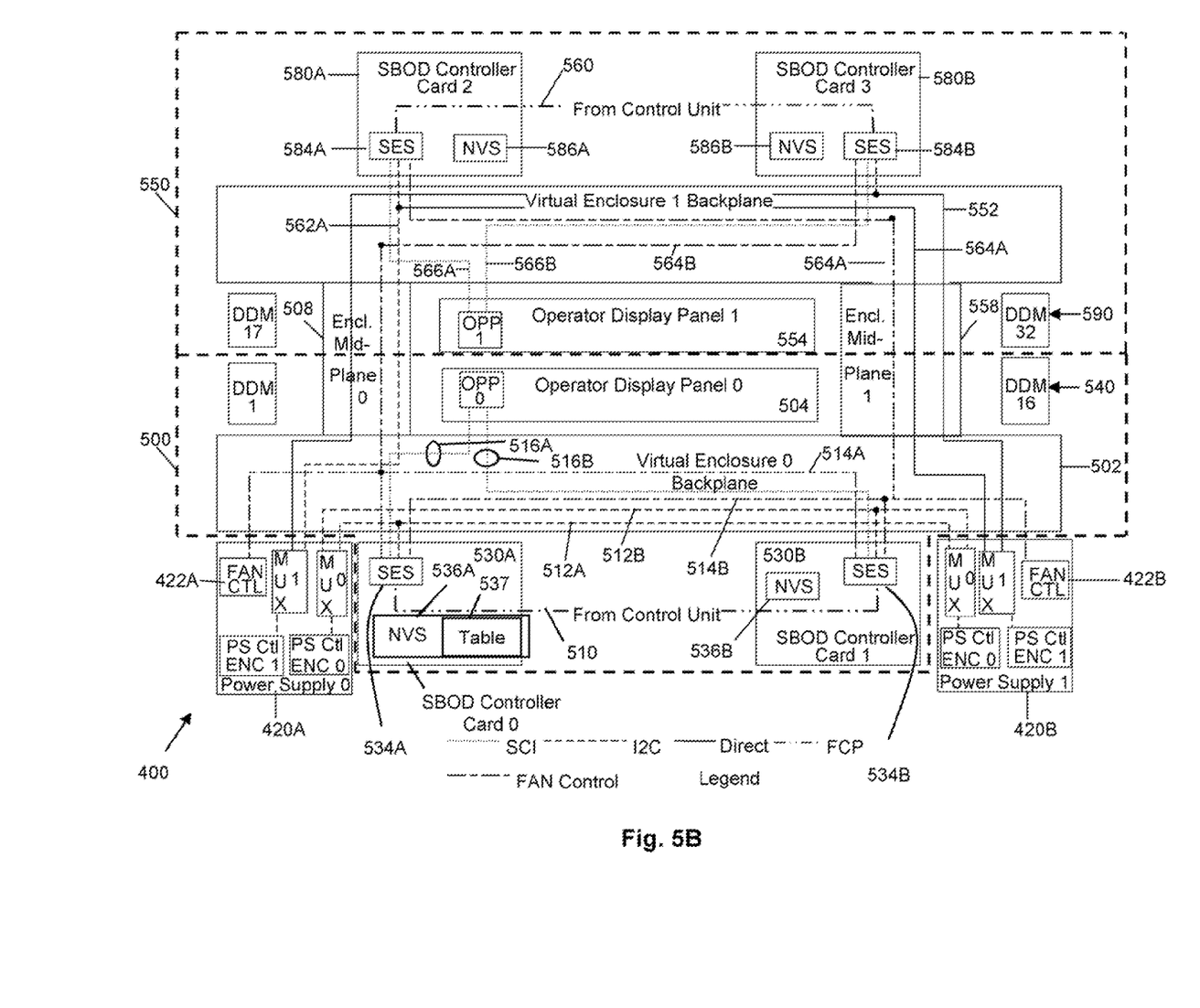
FIG. 5B is a block diagram of the flexible storage enclosure of FIG. 5A in a high-density configuration partitioned into two virtual enclosures on independent domains.

FIG. 5B is a block diagram of the storage enclosure 400 of FIG. 5A in a high-density configuration and partitioned into two virtual enclosures 500, 550. As will be described below, each power supply 420A, 420B may each be associated with one of the virtual enclosures although they are shared by both virtual enclosures 500, 550 for redundancy purposes. The first virtual enclosure 500 includes sixteen DDMs 540 and a redundant pair of controller cards 530A, 530B. Both controller cards 530A, 530B include a switch 532A, 532B (see FIG. 7), a SCSI enclosure services (SES) processor 534A, 534B and associated memory, such as nonvolatile storage (NVS) 536A, 536B. The backplane 520 may be partitioned into two (or more) virtual backplanes 502, 552 as part of the two virtual enclosures 500, 550, respectively. One virtual backplane 502 interconnects the components of the first virtual enclosure 500 and an operator display panel 504 provides a display of the status of the enclosure 500. A path 510, such as a Fibre Channel/Arbitrated Loop (FC-AL) link, interconnects the two SES processors 534A, 534B with an external system control or configuration unit. Redundant paths 512A, 512B, such as an inter-IC (I²C) bus, provide control paths from each SES processor 534A, 534B to each power supply 420A, 420B. Similarly, redundant paths 514A, 514B provide control paths from each SES processor 534A, 534B to a fan controller 422A, 422B in each power supply 420A, 420B. And, paths 516A, 516B interconnect each SES processor 534A, 534B with the first operator display panel 504.

Similarly, the second virtual enclosure 550 includes sixteen DDMs 590 and a redundant pair of controller cards 580A, 580B. Both controller cards 580A, 580B include a switch 532A, 532B (see FIG. 7)) an SES processor 584A, 584B and associated memory, such as NVS 586A, 586B. The second virtual backplane 552 interconnects the components of the second virtual enclosure 550 and an operator display panel 554 provides a display of the status of the enclosure 550. A path 560, such as an FC-AL link, interconnects the two SES processors 584A, 584B with the external system control units. Redundant paths 562A, 562B, such as an I²C bus, provide control paths from each SES processor 584A, 584B to each power supply 420A, 420B. Similarly redundant paths 564A, 564B provide control paths from each SES processor 584A, 584B to a fan controller 422A, 422B in each power supply 420A, 420B. And, paths 566A, 566B interconnect each SES processor 584A, 584B with the second operator display panel 554.

Virtual enclosure midplanes 508, 558 interconnect the backplanes 502, 552 of the two virtual enclosures 500, 550. Thus, the logical partitioning of the physical enclosures provides each of the two virtual enclosures 500, 550 with the disk fabric loops or network interconnections that they would have in the single enclosure design of FIG. 1. It will be appreciated that the physical enclosure may be configured as more than two virtual enclosures within the scope of the present invention.

The controlling software, firmware or microcode is substantially the same with any of the three arrangements. The enclosure configuration may be performed when the enclosure 400 is installed or modified in a customer's facility. The SES processors 534A, 534B, 584A, 584B are coupled to the configuration or control unit, such as a notebook PC, via the lines 510, 560 (FIG. 5B). One of the virtual enclosures, such as the first enclosure 500, is designated as the master enclosure and one of the SES processors in the master enclosure, such as processor 534A, is designated as the master processor (although the other SES processor 534B may instead be designated as the master). Nonvolatile storage 536A associated with the master processor 534A stores an SES table 537 into which parameters are loaded from the configuration unit to define the enclosure configuration. The table 537 is then accessed by the master processor 534A and enables and disables links within the physical enclosure 400 to configure the enclosure 400 with a single instance of trunked virtual storage enclosures or with multiple independent virtual enclosures.

Figure 6A:
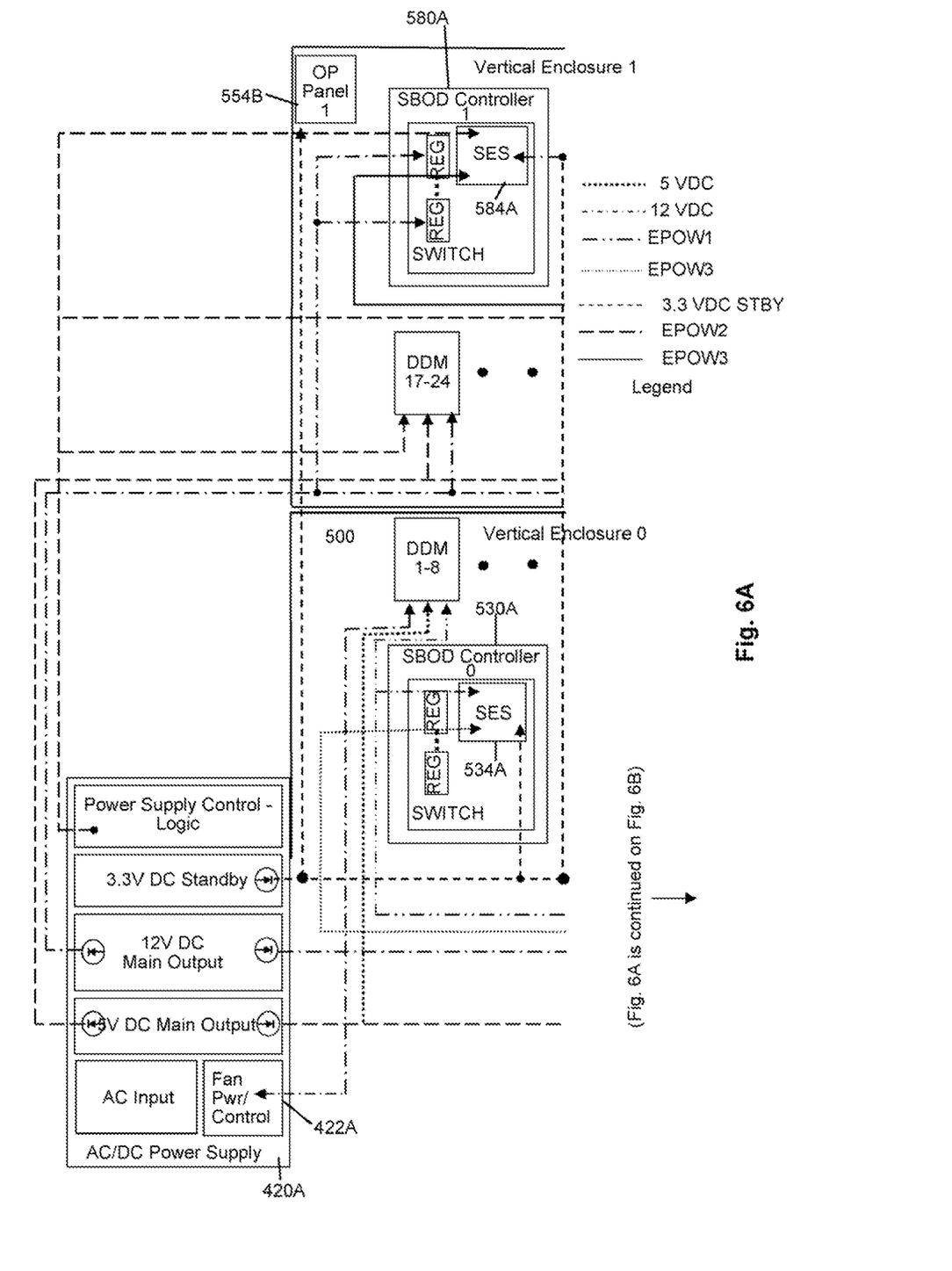
Figure 6B:
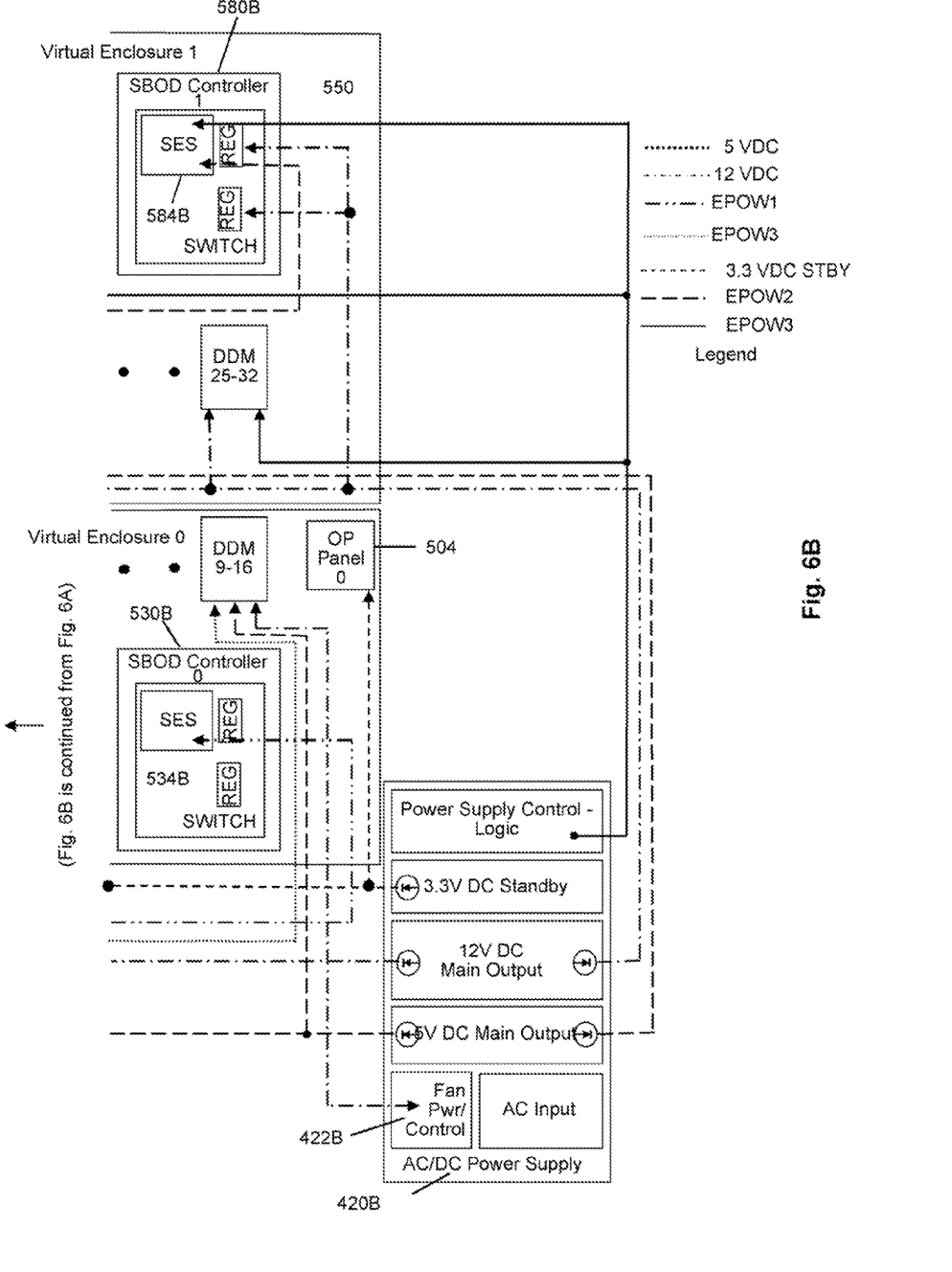

FIGS. 6A and 6B illustrate a block diagram of the distribution of power from the power supplies 420A, 420B to the various components of the two virtual enclosures 500, 550. As with the disk fabric network interconnections, the logical partitioning of the physical enclosures provided each of the two virtual enclosures 500, 550 with the power distribution and control functions that they would have in the single enclosure design of FIG. 1. According to the present invention, the first power supply 420A and first blower 440A (FIG. 4B) and the second power supply 420B and second blower 440B (FIG. 4B) each have independently controlled power outputs for the virtual enclosures 500 and 550. When the system is configured as a single unit, the outputs are coordinated as a single redundant power system. When configured as independent virtual enclosures, the outputs are controlled to allow a SES processor in each virtual enclosure instance to manage the outputs as a separate redundant power system for each one.

Figure 7:
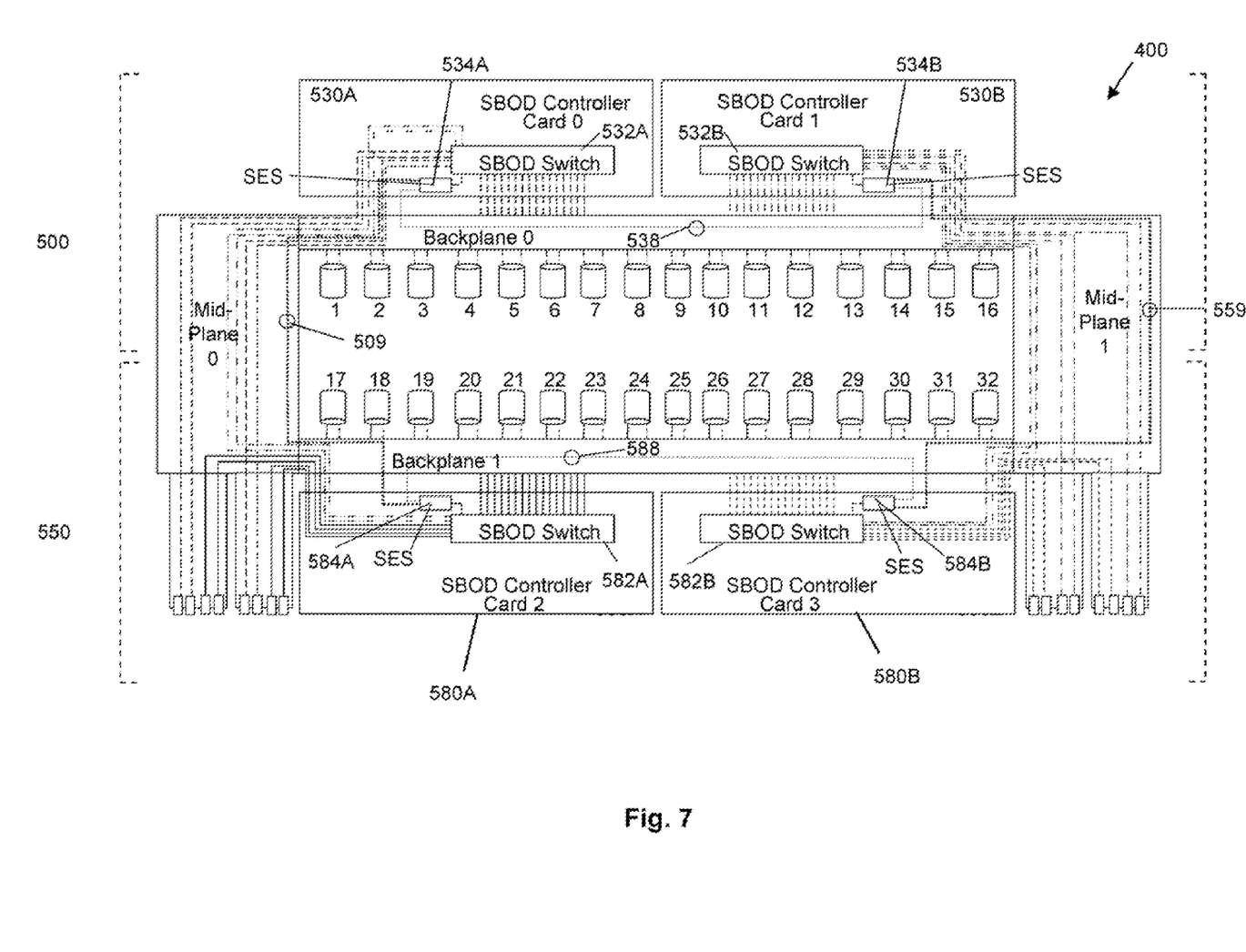
FIG. 7 is a block diagram of a dual-virtual high-density storage enclosure highlighting inter-virtual enclosure communications.

FIG. 7 is a block diagram of the dual-virtual enclosure high-density storage enclosure 400 of the present invention highlighting communications paths among the SES processors 534A, 534B, 584A, 584B of the two virtual enclosures 500, 550. One link 538 in the first virtual enclosure 500 provides intra-enclosure communication between the SES processors 534A, 534B while a corresponding link 588 in the second virtual enclosure 550 provides intra-enclosure communication between the SES processors 584A, 584B, thereby providing redundancy and allowing the storage enclosure 400 to remain in operation in the event one SES processor fails. Another link 509 provides inter-enclosure communication between the SES processor 534A on a controller card 530A in the first virtual enclosure 500 and the SES processor 584A on a controller card 580A in the second virtual enclosure 550. And, a corresponding link 559 provides inter-enclosure communication between the SES processor 534B on the other controller card 530B in the first virtual enclosure 500 and the SES processor 584B on the other controller card 580B in the second virtual enclosure 550. In the present invention, during normal operations, the inter-enclosure links 509, 559 are disabled.

Figure 8:
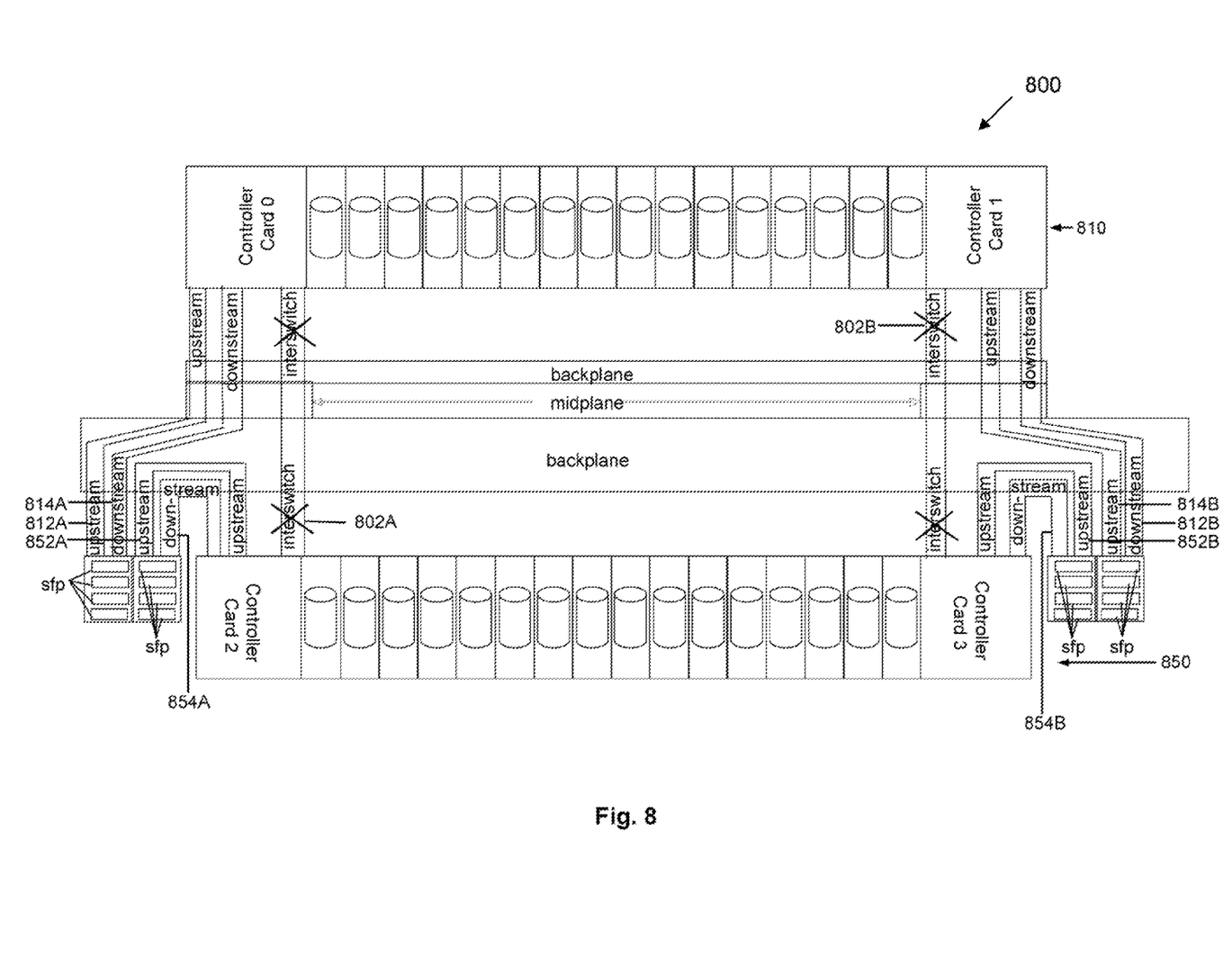
FIG. 8 is a representation of an embodiment of the present invention in which two virtual (logical) enclosures are configured as independent virtual enclosures.

FIG. 8 is a representation of an embodiment of the present invention in which two virtual (logical) enclosures 810, 850 of a physical enclosure 800 are configured as independent virtual enclosures in independent fabric loops or domains. In such a configuration, inter-card links 802A, 802B are disabled and each virtual enclosure 810, 850 has its own independent redundant instances of input (upstream) ports and links 812A, 812B and 852A, 852B, respectively, and output (downstream) ports and links 814A, 814B and 854A, 854B, respectively.

Figure 9:
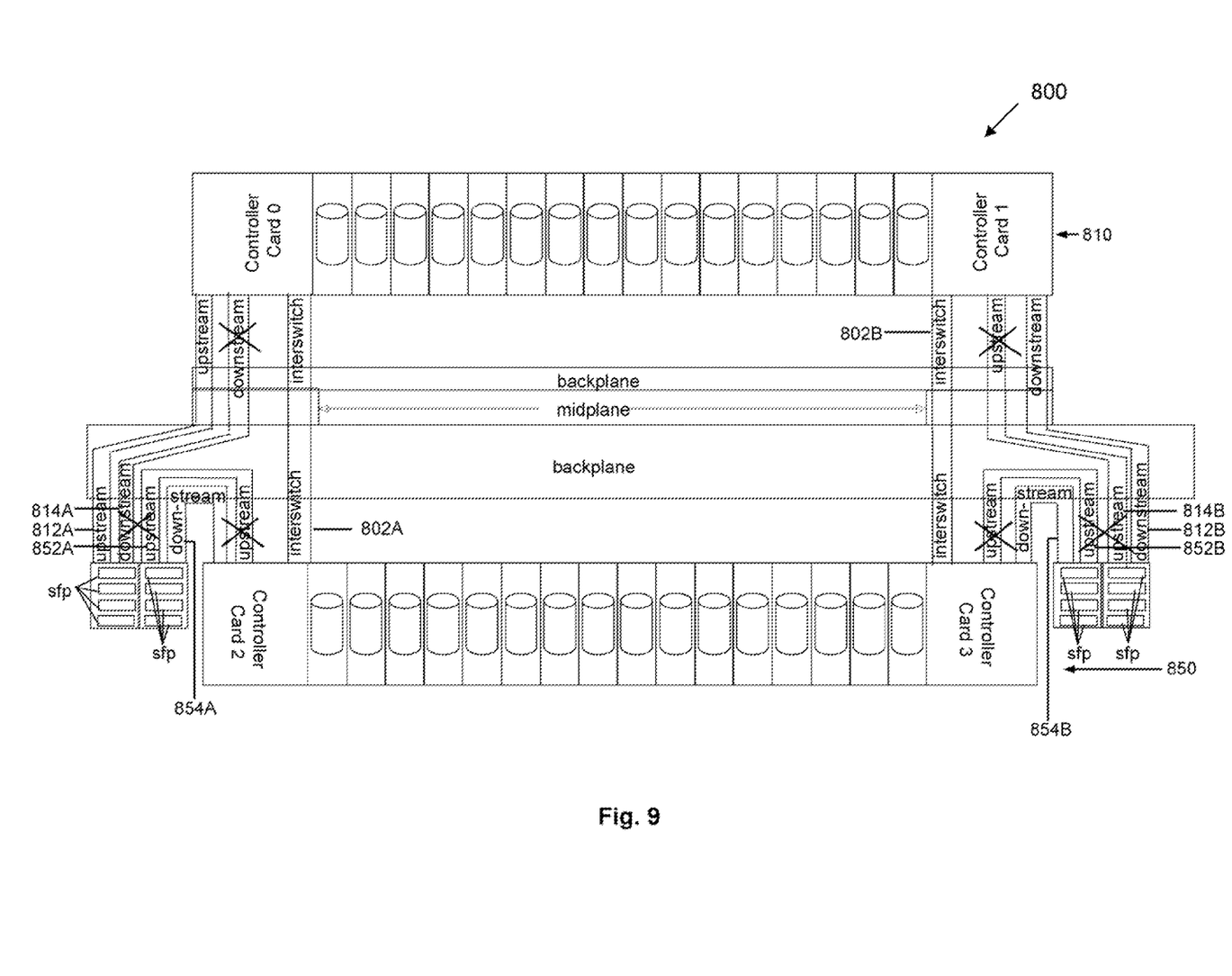
FIG. 9 is a representation of an embodiment of the present invention in which two logical enclosures in a trunked (or cascaded string) configuration.

FIG. 9 is a representation of an embodiment of the present invention in which the two logical enclosures 810, 850 are configured in a trunked (or cascaded string) manner. In this configuration, the inter-card links 802A, 802B are enabled. The two virtual enclosures 810, 850 share a single instance of input and output connector ports: one set of input ports 852A, 852B are disabled and one set of output ports 814A, 814B are similarly disabled. Thus, one set of input ports 812A, 812B and one set of output ports 854A, 854B serve the entire enclosure 800 with inter-enclosure communications being conducted over the pair of inter-switch links 802A, 802B. It will be appreciated that either the input/output ports may be enabled/disabled or the corresponding connecting links may be enabled/disabled to achieve the same result.

Thus, a single, high density, physical enclosure 800 may be easily provided as either configuration by including or excluding certain interconnections and by programming the SES processors. For example, a customer preferring to reduce the cost of the device by eliminating the cost of certain interconnect components (such as four cables and eight small form factor pluggable connections) may chose to configure the device in the internally trunked configuration described in FIG. 9. Alternatively, a customer may prefer implementing multiple independent communication networks for greater reliability or finer granularity in storage allocation to various systems by configuring the virtual enclosures on independent loops which may be coupled to separate control units.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. For example, certain components have been described as being coupled to a backplane and other components as being coupled to a midplane. However, such description is not intended to limit components to being coupled to either a backplane or to a mid-plane. Rather, either a backplane and a mid-plane may used and both may be generically labeled as a "connector plane." Moreover, although described above with respect to methods and systems, the need in the art may also be met with a computer program product containing instructions for logically partitioning disk storage enclosures or a method for deploying computing infrastructure comprising integrating computer readable code into a computing system for logically partitioning disk storage enclosures.

What is claimed is:

1. A data storage enclosure, comprising:

an enclosure connector plane, comprising:

first, second, third and fourth controller card connectors; and first and second pluralities of disk connectors;

a first plurality of hard disk drives (HDDs), each HDD coupled to one of the first plurality of disk connectors;

first and second redundant controller cards associated with the first plurality of HDDs and coupled to the first and second controller card connectors, respectively, each of the first and second controller cards containing a SCSI enclosure services (SES) processor and a non-volatile storage (NVS) unit associated with the SES processor, the first SES processor being designated as a master processor, the first controller card further containing a configuration table stored in the NVS unit associated with the master SES processor and accessible by the master SES processor into which one of a first, second and third configuration instruction, defining a storage enclosure configuration, is loadable from an external configuration unit;

if second plurality of HDDs is not installed in the second plurality of disk connectors and the first configuration instruction is stored in the configuration table, the master SES processor enables and disables paths within the storage enclosure such that the data storage enclosure is configurable into a first configuration as a single low density storage enclosure;

if the second plurality of HDDs is installed in the second plurality of disk connectors and the second configuration instruction is stored in the configuration table, the master SES processor enables and disables paths within the storage enclosure such that the data storage enclosure is configurable into a second configuration as high density trunked virtual enclosures; and if the second plurality of HDDs is installed in the second plurality of disk connectors, third and fourth controller cards are installed in the third and fourth controller card connectors and the third configuration instruction is stored in the configuration table, the master SES processor enables and disables paths within the storage enclosure such that the data storage enclosure is configurable into a third configuration as two low density virtual enclosures.

2. The data storage enclosure of claim 1, further comprising:

first, second, third and fourth input ports coupled to the enclosure connector plane and connectable through first, second, third and fourth input links to corresponding input connectors of the first, second, third and fourth controller card connectors, respectively;

first, second, third and fourth output ports coupled to the enclosure connector plane and connectable through first, second, third and fourth output links to corresponding output connectors of the first, second, third and fourth controller card connectors, respectively; and the enclosure connector plane further including a first inter-card link connectable between inter-card connectors of the first and third controller card connectors and a second inter-card link connectable between the second and fourth controller card connectors.

3. The data storage enclosure of claim 2, wherein in the second configuration, the first and second inter-card links are enabled to couple the first controller card with the third controller card and the second controller card with the fourth controller card, respectively;

the first and second input links are enabled to connect the first and second controller cards to the first and second input ports, respectively; and the third and fourth output links are enabled to connect the third and fourth controller cards to the third and fourth output ports, respectively;

whereby, the data storage enclosure comprises a dual-trunked enclosure.

4. The data storage enclosure of claim 2, wherein in the third configuration, the first and second inter-card links are disabled;

the first, second, third and fourth input links are enabled to connect the first, second, third and fourth controller cards to the first, second, third and fourth input ports, respectively; and the first, second, third and fourth output links are enabled to connect the first, second, third and fourth controller cards to the first, second, third and fourth output ports, respectively;

whereby, the data storage enclosure comprises dual-independent virtual enclosures.

5. A method for configuring a data storage enclosure having a first plurality of disk connectors to which a first plurality of hard disk drives (HDDs) is connected, first and second controller card connectors, first and second redundant controller cards associated with the first plurality of HDDs and coupled to the first and second controller card connectors, respectively, first and second SCSI enclosure services (SES) processors on the first and second controller cards, respectively, first and second non-volatile storage (NVS) units associated with the first and second SES processors, respectively, the first SES processor being designated as a master processor, a second plurality of disk connectors to which a second plurality of hard disk drives (HDDs) is connectable and third and fourth controller card connectors to which third and fourth redundant controller cards are connectable, the method comprising:

receiving one of three configuration instructions from a configuration control unit and storing the received configuration instruction in a configuration table in the first NVS unit to be executed by the master SES processor on the first controller card;

if second plurality of HDDs is not installed in the second plurality of disk connectors and the received configuration instruction comprises the first configuration instruction, executing the instruction stored in the configuration table to configure the data storage enclosure as a single low density storage enclosure;

if the second plurality of HDDs is installed in the second plurality of disk connectors and the configuration instruction comprises the second configuration instruction, executing the instruction stored in the configuration table to configure the data storage enclosure as high density trunked virtual storage enclosures; and if the second plurality of HDDs is installed in the second plurality of disk connectors, the third and fourth controller cards are installed in the third and fourth controller card connectors and the received configuration instruction comprises the third configuration instruction, executing the instruction stored in the configuration table to configure the data storage enclosure as two low density virtual enclosures.

6. The method of claim 5, further comprising:

providing first, second, third and fourth input ports coupled to an enclosure connector plane and connectable through first, second, third and fourth input links to corresponding input connectors of first, second, third and fourth controller card connectors, respectively;

providing first, second, third and fourth output ports coupled to the enclosure connector plane and connectable through first, second, third and fourth output links to corresponding output connectors of the first, second, third and fourth controller card connectors, respectively; and providing a first inter-card link connectable through the enclosure connector plane between inter-card connectors of the first and third controller card connectors and a second inter-card link connectable through the enclosure connector plane between the second and fourth controller card connectors.

7. The method of claim 6, wherein configuring the data storage enclosure as high density trunked virtual storage enclosure comprises:

enabling the first and second inter-card links;

enabling the first and second input links; and enabling the first and second output links.

8. The method of claim 6, wherein configuring the data storage enclosure as dual-independent virtual enclosures comprises:

disabling the first and second inter-card links;

enabling the first, second, third and fourth input links; and enabling the first, second, third and fourth output links.

9. A computer program product of a computer readable storage medium usable with a programmable computer, the computer program product having computer-readable code embodied therein for configuring a data storage enclosure having a first plurality of disk connectors to which a first plurality of hard disk drives (HDDs) is connected, first and second controller card connectors, first and second redundant controller cards associated with the first plurality of HDDs and coupled to the first and second controller card connectors, respectively, first and second SCSI enclosure services (SES) processors on the first and second controller cards, respectively, first and second non-volatile storage (NVS) units associated with the first and second SES processors, respectively, the first SES processor being designated as a master processor, a second plurality of disk connectors to which a second plurality of hard disk drives (HDDs) is connectable and third and fourth controller card connectors to which third and fourth redundant controller cards are connectable, the computer-readable code comprising instructions for:

receiving one of three configuration instructions from a configuration control unit and storing the received configuration instruction in a configuration table in the first NVS unit to be executed by the master SES processor on the first controller card;

if second plurality of HDDs is not installed in the second plurality of disk connectors and the received configuration instruction comprises a first configuration instruction, executing the instruction stored in the configuration tables to configure the data storage enclosure as a single low density storage enclosure;

if the second plurality of HDDs is installed in the second plurality of disk connectors and the configuration instruction comprises the second configuration instruction, executing the instruction stored in the configuration table to configure the data storage enclosure as high density trunked virtual storage enclosures; and if the second plurality of HDDs is installed in the second plurality of disk connectors, the third and fourth controller cards are installed in the third and fourth controller card connectors and the received configuration instruction comprises the third configuration instruction, executing the instruction stored in the configuration table to configure the data storage enclosure as two low density virtual enclosures.

10. The computer program product of claim 9, wherein the instructions for configuring the data storage enclosure as high density trunked virtual storage enclosures comprise instructions for:
   enabling a first inter-card link between a first controller card and a second controller card;
   enabling a second inter-card link between a third controller card and a fourth controller card;
   enabling first and second input links to connect the first and second controller cards to first and second input ports, respectively; and
   enabling first and second output links to connect the third and fourth controller cards to third and fourth output ports, respectively.

11. The computer program product of claim 9, wherein the instructions for configuring the data storage enclosure as two low density virtual enclosures comprise instructions for:
   disabling a first inter-card link between a first controller card and a second controller card;
   disabling a second inter-card link between a third controller card and a fourth controller card;
   enabling first, second, third and fourth input links to connect first, second, third and fourth controller cards to first, second, third and fourth input ports, respectively; and
   enabling first, second, third and fourth output links to connect the first, second, third and fourth controller cards to first, second, third and fourth output ports, respectively.

12. A method for deploying computing infrastructure, comprising integrating computer readable code into a computing system having a first plurality of disk connectors to which a first plurality of hard disk drives (HDDs) is connected, first and second controller card connectors, first and second redundant controller cards associated with the first plurality of HDDs and coupled to the first and second controller card connectors, respectively, first and second SCSI enclosure services (SES) processors on the first and second controller cards, respectively, first and second non-volatile storage (NVS) units associated with the first and second SES processors, respectively, the first SES processor being designated as a master processor, a second plurality of disk connectors to which a second plurality of hard disk drives (HDDs) is connectable and third and fourth controller card connectors to which third and fourth redundant controller cards are connectable, wherein the code, in combination with the computing system, is capable of performing the following:

receiving one of three configuration instructions from a configuration control unit and storing the received configuration instruction in a configuration table in the first NVS unit to be executed by the master SES processor;
   if second plurality of HDDs is not installed in the second plurality of disk connectors and the received configuration instruction comprises the first configuration instruction, executing the instruction stored in the configuration table to configure the data storage enclosure as a single low density storage enclosure;
   if the second plurality of HDDs is installed in the second plurality of disk connectors and the configuration instruction comprises the second configuration instruction, executing the instruction stored in the configuration table to configure the data storage enclosure as high density trunked virtual storage enclosures; and
   if the second plurality of HDDs is installed in the second plurality of disk connectors, the third and fourth controller cards are installed in the third and fourth controller card connectors and the configuration instruction comprises the third configuration instruction, executing the instruction stored in the configuration table to configure the data storage enclosure as two low density virtual enclosures.

13. The method of claim 12, further comprising:
   providing first, second, third and fourth input ports coupled to an enclosure connector plane and connectable through first, second, third and fourth input links to corresponding input connectors of first, second, third and fourth controller card connectors, respectively;
   providing first, second, third and fourth output ports coupled to the enclosure connector plane and connectable through first, second, third and fourth output links to corresponding output connectors of the first, second, third and fourth controller card connectors, respectively; and
   providing a first inter-card link connectable through the enclosure connector plane between inter-card connectors of the first and third controller card connectors and a second inter-card link connectable through the enclosure connector plane between the second and fourth controller card connectors.

14. The method of claim 13, wherein configuring the data storage enclosure as high density dual trunked storage enclosures comprises:
   enabling the first and second inter-card links;
   enabling the first and second input links; and
   enabling the first and second output links.

15. The method of claim 13, wherein configuring the data storage enclosure as dual-independent virtual enclosures comprises:
   disabling the first and second inter-card links;
   enabling the first, second, third and fourth input links; and
   enabling the first, second, third and fourth output links.

* * * * *